United States Patent
Higa et al.

(10) Patent No.: US 10,626,325 B2
(45) Date of Patent: Apr. 21, 2020

(54) TRANSPARENT PHOSPHORESCENCE MATERIAL AND METALLIC PRODUCT HAVING APPLIED THE TRANSPARENT PHOSPHORESCENCE MATERIAL

(71) Applicant: TATEYAMA KAGAKU INDUSTRY CO. LTD., Toyama-shi, Toyama (JP)

(72) Inventors: Takumi Higa, Toyama (JP); Tomoko Shirakawa, Toyama (JP); Hitoshi Moriizumi, Toyama (JP)

(73) Assignee: TATEYAMA KAGAKU INDUSTRY CO. LTD., Toyama-shi, Toyama (JP)

(*) Notice: Subject to any disclaimer, the term of this patent is extended or adjusted under 35 U.S.C. 154(b) by 155 days.

(21) Appl. No.: 15/553,378

(22) PCT Filed: Oct. 6, 2015

(86) PCT No.: PCT/JP2015/078273
§ 371 (c)(1),
(2) Date: Aug. 24, 2017

(87) PCT Pub. No.: WO2016/136012
PCT Pub. Date: Sep. 1, 2016

(65) Prior Publication Data
US 2018/0072943 A1 Mar. 15, 2018

(30) Foreign Application Priority Data
Feb. 26, 2015 (JP) .................................. 2015-036147

(51) Int. Cl.
| | | |
|---|---|---|
| B32B 15/098 | (2006.01) |
| C08K 3/18 | (2006.01) |
| C08K 3/30 | (2006.01) |
| C08K 3/34 | (2006.01) |
| C09D 5/22 | (2006.01) |
| C09D 5/33 | (2006.01) |
| C09K 11/02 | (2006.01) |
| C09K 11/08 | (2006.01) |

(52) U.S. Cl.
CPC .......... C09K 11/025 (2013.01); B32B 15/098 (2013.01); C08K 3/18 (2013.01); C08K 3/30 (2013.01); C08K 3/34 (2013.01); C09K 11/02 (2013.01); C09K 11/08 (2013.01); *C08K 2003/3036* (2013.01); *C09D 5/004* (2013.01); *C09D 5/22* (2013.01)

(58) Field of Classification Search
CPC ....... C09K 11/02; C09K 11/025; C09K 11/08; C09D 5/004; C09D 5/22
See application file for complete search history.

(56) References Cited

U.S. PATENT DOCUMENTS

| | | | |
|---|---|---|---|
| 4,188,449 A | 2/1980 | Krall et al. | |
| 6,005,024 A * | 12/1999 | Anders | .................. C09D 5/004 |
| | | | 252/301.36 |
| 2003/0039820 A1 | 2/2003 | Hall et al. | |
| 2005/0158526 A1* | 7/2005 | Ino | ............................ C09D 5/22 |
| | | | 428/207 |
| 2005/0271897 A1 | 12/2005 | Sturley | |
| 2007/0254149 A1 | 11/2007 | Eckert | |
| 2015/0221831 A1* | 8/2015 | Kim | ........................ H01L 33/56 |
| | | | 257/98 |

FOREIGN PATENT DOCUMENTS

| | | |
|---|---|---|
| EP | 0549808 A1 * | 7/1993 |
| EP | 0726303 A2 | 8/1996 |
| JP | 61176369 A | 8/1986 |
| JP | 3024904 U | 6/1996 |
| JP | 10028929 A | 2/1998 |
| JP | 11241052 A | 9/1999 |
| JP | 11300886 A | 11/1999 |
| JP | 2000043224 A | 2/2000 |
| JP | 2003136624 A | 5/2003 |
| JP | 2005219413 A | 8/2005 |
| JP | 2006251155 A | 9/2006 |
| JP | 2007270094 A | 10/2007 |
| JP | 2008511692 A | 4/2008 |
| JP | 2012217983 A | 11/2012 |
| JP | 2014231554 A | 12/2014 |

OTHER PUBLICATIONS

Machine translation of JP2005219413 to Mogi obtained from the European Patent Office on Mar. 22, 2019.*
International Search Report (ISR) and Written Opinion dated Dec. 15, 2015 issued in International Application No. PCT/JP2015/078273.
International Preliminary Report on Patentability (IPRP) dated Aug. 29, 2017 issued in counterpart International Application No. PCT/JP2015/078273.
Extended European Search Report (EESR) dated Jul. 24, 2018, issued in counterpart European Application No. 15883302.0.

* cited by examiner

*Primary Examiner* — Melissa A Rioja
(74) *Attorney, Agent, or Firm* — Holtz, Holtz & Volek PC

(57) ABSTRACT

A transparent phosphorescence material includes a mixture of a phosphorescent material powder obtained by pulverizing a phosphorescent material, a resin of a phenol, and a curing agent. The phosphorescent material powder has an average particle diameter of 10 to 20 μm, the resin is a modified bisphenol, and the curing agent is an aliphatic polyamine. A mass ratio of the phosphorescent material powder, the resin, and the curing agent in the mixture is such that the phosphorescent material powder is 15 to 25 wt %, the resin is 50 to 70 wt %, and the curing agent is 15 to 25 wt %. When the transparent phosphorescence material is applied to a surface of a metal substrate, the surface of the metal substrate is visible through the transparent phosphorescence material. The transparent phosphorescence material emits a light due to phosphorescence in the dark.

2 Claims, 2 Drawing Sheets

TRANSPARENT PHOSPHORESCENCE MATERIAL AND METALLIC PRODUCT HAVING APPLIED THE TRANSPARENT PHOSPHORESCENCE MATERIAL

TECHNICAL FIELD

The present invention relates to a transparent phosphorescence material which is formed on the surface of a metal substrate and which has phosphorescence, and a metallic product having applied thereto the transparent phosphorescence material.

BACKGROUND ART

Conventionally, as disclosed in PTLs 1 and 2, a method of applying a phosphorescent coating composition to the surface of an iron, nonferrous metal, alloy steel, or other metal substrate has been disclosed. For example, PTL 1 discloses a method in which the surface of a metallic plate is coated with a phosphorescent coating composition, and a transparent coating layer is formed on the phosphorescent coating composition layer and printed layer so that the film of the phosphorescent coating composition on the surface is not damaged by pressing or the like. Further, PTL 2 discloses a method in which a porous black chemical conversion film is formed by electrolysis on the surface of a metal substrate, and a primer coat film and a phosphorescent coating composition are applied to the surface of the film formed, and further the resultant surface is coated with a transparent topcoat film. The phosphorescent coating is coated by these coating methods so that the phosphorescent coating is durable when used for a long term and is prevented from being peeled off.

CITATION LIST

Patent Literature

PTL 1: JP-A-2005-219413
PTL 2: JP-A-2012-217983

SUMMARY OF INVENTION

Technical Problem

In both cases of the above-mentioned background art, three to four layers of phosphorescent coating films are formed on the surface of a metal, and thus many steps for production are needed, and an increased cost and a prolonged period of time are required. Further, the metallic luster or metallic appearance of the surface of the metal disappears, making it impossible to make use of the original surface of the metal. Furthermore, a satisfactory adhesion strength between the metal and the phosphorescent coating film cannot be obtained, and, especially when the metal to be coated is a casting, the surface of the casting is highly uneven so that the casting cannot be thoroughly coated. Conversely, when the surface to be coated is a surface of luster, such as a plated surface, it is difficult to achieve coating having high adhesion to the phosphorescent coating composition.

The present invention has been made in view of the above-mentioned problems accompanying the background art, and an object of the invention is to provide a transparent phosphorescence material which has high adhesion to a metal substrate and high durability, and which is transparent in the light and surely emits a light in the dark, and a metallic product having applied thereto the transparent phosphorescence material.

Solution to Problem

The present invention is directed to a transparent phosphorescence material which is provided by mixing together a phosphorescent material powder obtained by pulverizing a phosphorescent material, a resin of a phenol, and a curing agent, wherein the transparent phosphorescence material is applied to the surface of a metal substrate, wherein the transparent phosphorescence material is transparent in the light so that the surface of the metal substrate is visible through the transparent phosphorescence material, and the transparent phosphorescence material emits a light due to phosphorescence in the dark.

The phosphorescent material powder has an average particle diameter of 10 to 20 μm. The resin is, for example, a modified bisphenol. The curing agent is, for example, an aliphatic polyamine.

A mass ratio of the phosphorescent material powder, the resin, and the curing agent in the transparent phosphorescence material is such that the phosphorescent material powder is 15 to 25%, the resin is 50 to 70%, and the curing agent is 15 to 25%. A mass ratio is preferably such that the phosphorescent material powder is about 20%, the resin is about 60%, and the curing agent is about 20%. The transparent phosphorescence material may be one which has added thereto, in addition to the phosphorescent material powder, the resin, and the curing agent, at least one of a pigment having a color which is the complementary color of the color of the phosphorescent material powder and a high refractive-index material having a refractive index of 1.9 or more.

Further, the present invention is directed to a transparent phosphorescence material which is provided by mixing together a phosphorescent material powder obtained by pulverizing a phosphorescent material, and a resin having thermosetting properties, such as an acrylic resin, wherein the transparent phosphorescence material is applied to the surface of a metal substrate through a transparent primer, wherein the transparent phosphorescence material is transparent in the light so that the surface of the metal substrate is visible through the transparent phosphorescence material, and the transparent phosphorescence material emits a light due to phosphorescence in the dark.

The phosphorescent material powder has an average particle diameter of 1 to 10 μm. The primer is a resin having thermosetting properties, such as an alkyd resin, and the thickness of the primer applied to the metal substrate is 10 to 20 μm.

A mass ratio of the phosphorescent material powder and the resin in the transparent phosphorescence material is such that the phosphorescent material powder is 5 to 15% and the resin is 85 to 95%. A mass ratio is preferably such that the phosphorescent material powder is about 10% and the resin is about 90%. The transparent phosphorescence material may be one which has added thereto, in addition to the phosphorescent material powder, the resin, and the curing agent, at least one of a pigment having a color which is the complementary color of the color of the phosphorescent material powder and a high refractive-index material having a refractive index of 1.9 or more.

The present invention is directed to a metallic product which has the transparent phosphorescence material applied to the surface of a metal substrate, wherein the transparent phosphorescence material is transparent in the light so that the surface of the metal substrate is visible through the transparent phosphorescence material, and the transparent phosphorescence material emits a light due to phosphorescence in the dark.

The metallic product is a casting formed from tin, brass, bronze, or the like, and the transparent phosphorescence material is provided by mixing together a phosphorescent material powder obtained by pulverizing a phosphorescent material, a resin of a phenol, and a curing agent.

The metallic product has a surface mirror-finished by nickel plating or chrome plating, or a surface mirror-polished with a material, such as SUS, and the transparent phosphorescence material is provided by mixing together a phosphorescent material powder obtained by pulverizing a phosphorescent material, and a resin having thermosetting properties, such as an acrylic resin, and a primer is formed between the transparent phosphorescence material and the surface of the metal substrate.

Advantageous Effects of Invention

The transparent phosphorescence material of the present invention and a metallic product having applied thereto the transparent phosphorescence material are advantageous in that the phosphorescence material can be applied to a metal substrate by a simple step so as to have high adhesion and high durability, and the transparent phosphorescence material is transparent in the light so that the surface of the metal substrate in the metallic product is visible through the transparent phosphorescence material, and can surely emit a light due to phosphorescence in the dark.

DESCRIPTION OF EMBODIMENTS

Figure 1:
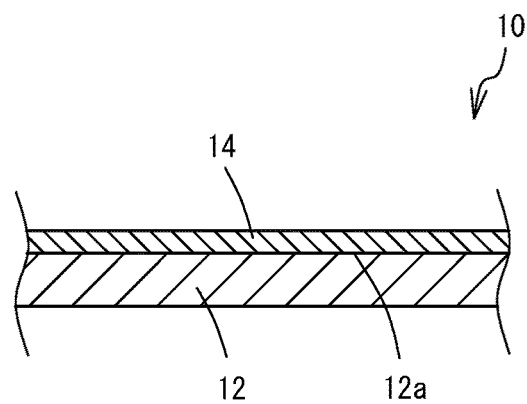
FIG. 1 A cross-sectional view of a metallic product having applied thereto a transparent phosphorescence material according to a first embodiment of the invention.
Figure 2:
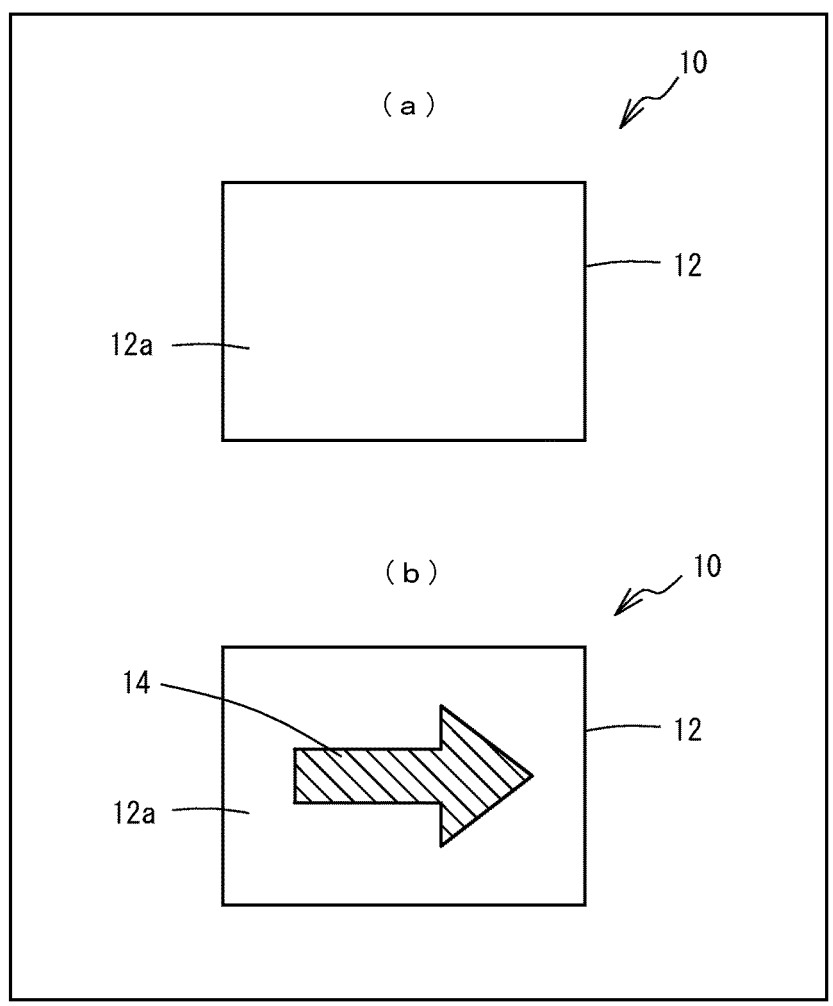
FIG. 2 A front view (a) of a metallic product in the light, and a front view (b) of the metallic product in the dark, wherein the metallic product has applied thereto the transparent phosphorescence material according to the first embodiment of the invention.

Hereinbelow, embodiments of the present invention will be described with reference to the drawings. FIGS. 1 and 2 show a first embodiment of the present invention, and a metallic product 10 of the present embodiment comprises a metal substrate formed into a predetermined shape, and a transparent phosphorescence material 14 applied to the surface 12a of the metal substrate 12.

The transparent phosphorescence material 14 is provided by mixing together a phosphorescent material powder, a resin, and a curing agent. The phosphorescent material powder is obtained by pulverizing a phosphorescent material formed from an inorganic material having a phosphorescence function, such as zinc sulfide (ZnS-based), strontium magnesium silicate (SrMgSi2O7-based), or strontium aluminate (SrAl2O4-based). The phosphorescent material powder advantageously has an average particle diameter of 10 to 20 μm in view of transparency, handling properties upon mixing, and the like, preferably 14 to 16 μm, for example, 15 μm. The resin is a phenol, for example, a modified bisphenol. The curing agent is an aliphatic polyamine. A mass ratio of the phosphorescent material powder, the resin, and the curing agent is such that the phosphorescent material powder is 15 to 25%, the resin is 50 to 70%, and the curing agent is 15 to 25%, and generally such that the phosphorescent material powder is 20%, the resin is 60%, and the curing agent is 20%, each of which is advantageously controlled within ±10%. For example, the mass ratio is as follows: phosphorescent material powder:resin:curing agent=3 (18 wt %):10 (59 wt %):4 (23 wt %).

The transparent phosphorescence material 14 is transparent in the form of being applied, and the transparent phosphorescence material in the liquid state enables drawing of arbitrary patterns and characters on the surface 12a of the metal substrate 12, and is fixed to the metal substrate 12 by baking or air-drying. The transparent phosphorescence material may be fixed by electrodeposition or electrostatic deposition. For further improving the transparency, a pigment having a color which is the complementary color of the color of the phosphorescent material powder (for example, a color of orange or violet) may be added. Further, for reducing the difference in refractive index between the resin and the phosphorescent material or enhancing the transparency, a high refractive-index material powder having a refractive index of 1.9 or more, such as titanium oxide or barium titanate, is advantageously added. The high refractive-index material is advantageously a material having a refractive index of 1.9 to 2.9, preferably a refractive index of 2.0 to 2.7. Further, the use of both the above-mentioned complementary color material and high refractive-index material makes it possible to achieve the phosphorescence material which is nearly colorless and transparent.

In the metallic product 10, as shown in FIG. 2(a), the transparent phosphorescence material 14 is transparent in the light, and therefore only the surface 12a of the metal substrate 12 is visible through the transparent phosphorescence material. As shown in FIG. 2(b), the transparent phosphorescence material 14 emits a light due to phosphorescence in the dark, so that a pattern, such as an arrow, drawn by the transparent phosphorescence material 14 is visible. With respect to the pattern, patterns other than an arrow, characters, and the like can be arbitrarily drawn.

The metallic product 10 is a casting formed from tin, brass, bronze, or the like. Applications of the metallic product include interiors, toys, crafted objects, and various portable devices, and can be arbitrarily selected. The surface of the casting is uneven, and the transparent phosphorescence material 14 is applied to cover the uneven surface so as to adhere to the surface. The transparent phosphorescence material 14 may be either applied to the entire surface of the metallic product 10 or partially applied to the metallic product.

The transparent phosphorescence material 14 of the present embodiment and the metallic product 10 having applied thereto the transparent phosphorescence material 14 are advantageous in that the phosphorescence material can be applied to the metal substrate 12 by a simple step so as to have high adhesion and high durability. The transparent phosphorescence material is transparent in the light so that the surface 12a of the metal substrate 12 in the metallic product 10 is visible through the transparent phosphorescence material, and the metallic product is seen as if the transparent phosphorescence material 14 is not present, and is not affected by the transparent phosphorescence material 14 and has a natural appearance free of unnaturalness. The transparent phosphorescence material can surely emit a light due to phosphorescence in the dark to draw attention. Particularly, the portion which has no display in the light emits a light due to phosphorescence in the dark to cause patterns and characters to appear, making it possible to attract someone who looks at the product. The metallic product 10 is a casting and the surface 12a is uneven, but the transparent phosphorescence material 14 is applied so as to thoroughly cover the uneven surface with a high peel strength, and therefore a pretreatment or the like is not needed and the production process is simple, and the texture of the uneven surface of the casting can be effectively used. In addition, the transparent phosphorescence material 14 emits a light in the dark without any electric power and hence saves energy, and the transparent phosphorescence material emits a light even when power supply is cut, and therefore can display an indication for evacuation route guidance and the like and thus can be used to take measures to prevent disasters. The transparent phosphorescence material 14 is insoluble in a solvent, and has high long-term storage properties and is easy to handle.

Figure 3:
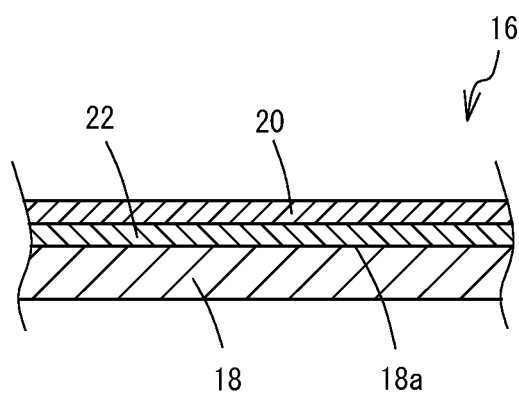
FIG. 3 A cross-sectional view of a metallic product having applied thereto a transparent phosphorescence material according to a second embodiment of the invention.

Next, a second embodiment of the present invention is described with reference to FIG. 3. A metallic product 16 of the present embodiment comprises a metal substrate 18 which is formed into a predetermined shape, and which has a surface treated by plating or the like, and a transparent phosphorescence material 20 applied to a surface 18a of the metal substrate 18. A primer 22 is formed between the surface 18a of the metal substrate 18 and the transparent phosphorescence material 20.

The transparent phosphorescence material 20 is provided by mixing together a phosphorescent material powder and a resin. The phosphorescent material powder is obtained by pulverizing a phosphorescent material formed from the above-mentioned inorganic material, and the phosphorescent material powder has an average particle diameter of 1 to 10 μm in view of transparency after applied, handling properties upon mixing, and the like, preferably 2 to 6 μm, for example, about 4 μm. The resin has thermosetting properties, and is, for example, an acryl urethane resin, an acryl silicone resin, a melamine resin, an alkyd resin, or an acrylic resin. A mass ratio of the phosphorescent material powder and the resin is such that the phosphorescent material powder is 5 to 15% and the resin is 85 to 95%, and generally such that the phosphorescent material powder is 10% and the resin is 90%, each of which is within ±10%.

The transparent phosphorescence material 20 is transparent in the form of being applied, and the transparent phosphorescence material in the liquid state enables drawing of arbitrary patterns and characters on the surface 18a of the metal substrate 18, and is fixed to the metal substrate 18 by baking coating. The transparent phosphorescence material may be fixed by electrodeposition or electrostatic deposition. For further improving the transparency, a pigment having a color which is the complementary color of the color of the phosphorescent material powder (for example, a color of orange or violet) may be added. Further, for reducing the difference in refractive index between the resin and the phosphorescent material, a high refractive-index material powder having a refractive index of 1.9 or more, such as titanium oxide or barium titanate, is advantageously added. The high refractive-index material is advantageously a material having a refractive index of 1.9 to 2.9, preferably a refractive index of 2.0 to 2.7. Further, the use of both the above-mentioned complementary color material and high refractive-index material makes it possible to achieve the phosphorescence material which is nearly colorless and transparent.

The primer 22 is a resin having thermosetting properties, for example, an acryl urethane resin, an acryl silicone resin, an epoxy resin, a melamine resin, or an alkyd resin. The thickness is 10 to 20 μm, preferably 15 μm.

The metal substrate 18 is an arbitrary metallic product which has a surface mirror-finished by a stainless steel alloy, such as SUS (Ni: 8 to 15 wt %, and Cr: 15 to 20 wt %), or which has been treated by nickel plating or chrome plating so as to have a mirror-finished surface. Applications of the metallic product include handrails and doorknobs in a house, various types of construction parts, displays for evacuation route guidance and the like, braille rivets for roads, and the like, and can be arbitrarily selected. The stainless steel or other metallic product treated by plating or the like has the surface 18a which is smooth and has excellent appearance, and the transparent phosphorescence material 20 is attached to the excellent surface 18a through the primer 22 so as to adhere to the surface. The transparent phosphorescence material 20 may be either applied to the entire surface of the metallic product 16 or partially applied to the metallic product.

The transparent phosphorescence material 20 of the present embodiment and the metallic product 16 having applied thereto the transparent phosphorescence material 20 have the same effects as those obtained by the above-mentioned embodiment, and the phosphorescence material can be applied to the metal substrate 18 by a simple step so as to have high adhesion and high durability, and the transparent phosphorescence material is transparent in the light so that the surface 18a of the metal substrate 18 in the metallic product 16 is visible through the transparent phosphorescence material, and the metallic product is seen as if the transparent phosphorescence material 20 is not present, and is not affected by the transparent phosphorescence material 20 and has a natural appearance free of unnaturalness. The transparent phosphorescence material can surely emit a light due to phosphorescence in the dark to draw attention. The metal substrate 18 is a metal or stainless steel material treated by plating, and the surface 18a is smooth and has excellent appearance, and the transparent phosphorescence material is applied to the smooth surface 18a so as to surely adhere to the surface, and the transparent phosphorescence material 20 and primer 22 have high transparency, making it possible to make use of the metallic appearance without sacrificing the gloss or luster of the surface 18a.

The transparent phosphorescence material of the invention and the metallic product having applied thereto the transparent phosphorescence material are not limited to the above-mentioned respective embodiments, and the materials for the phosphorescent material, resin, and primer can be arbitrarily selected, and the phosphorescent material may be one which surely emits a light, and the resin and primer may be ones which have high transparency and are surely fixed to the metal substrate. The metallic product is not limited to the above-mentioned embodiment, and the transparent phosphorescence material of the invention can be applied to products in various uses.

EXAMPLES

With respect to the metallic product according to the first embodiment of the present invention, a test was conducted in which the performance was compared between samples in which the formulation for the phosphorescent material powder, resin (modified bisphenol), and curing agent (aliphatic polyamine) was changed. With respect to the samples, for the reasons of transparency and handling properties upon mixing and the like, using a phosphorescent material powder having a particle diameter of 10 to 20 μm, transparent phosphorescence materials having seven different types of formulations shown below were prepared, and deposited onto a metal substrate which is a casting to prepare metallic products (samples A to G).

With respect to the samples A to G, three types of tests for the adhesion to a metal, transparency, and luminance were conducted. In the test method for the adhesion to a metal, a test was conducted in accordance with JIS K5600-5-6, and the results were shown by predetermined point rating (classification). The larger the point, the more likely the material is peeled off. In the test method for the transparency, 10 persons performed visual observation, and, when 8 or more persons answered that the sample was transparent, the sample was rated ○, and, when 5 to 7 persons answered that the sample was transparent, the sample was rated Δ. In the test method for the luminance, a sample was irradiated using a D65 light source at 20 lx for 20 minutes and then, after 60 minutes lapsed, a luminance was measured. The results are shown in Table 1.

TABLE 1

| Sample name | A | B | C | D | E | F | G |
|---|---|---|---|---|---|---|---|
| Particle diameter of phosphorescent material powder μm | 10 to 20 | | | | | | |
| Phosphorescent material powder % | 10 | | 20 | | 30 | | |
| Resin (modified bisphenol) % | 60 | 70 | 50 | 60 | 70 | 50 | 60 |
| Curing agent (aliphatic polyamine) % | 30 | 20 | 30 | 20 | 10 | 20 | 10 |
| Adhesion to metal (predetermined classification point) | 0 | 0 | 0 | 0 | 1 | 0 | 1 |
| Transparency | Δ | ○ | Δ | ○ | ○ | Δ | Δ |
| Luminance (uniform light emission) mcd/m$^2$ | 3 | 3 | 5 | 5 | 5 | 3 | 5 |

As can be seen from the above, the performance of the sample D was the most excellent. In the sample A, with respect to the transparency, the sample was slightly opaque due to the increase of the curing agent. Further, the luminance was slightly poor in uniformity due to an increase of the viscosity caused by the increase of the curing agent and the light emission was weak due to the reduction of the phosphorescent powder. In the sample B, with respect to the luminance, the light emission was uniform but weak due to the reduction of the phosphorescent material powder. In the sample C, with respect to the transparency, the sample was opaque due to an increase of the viscosity caused by the increase of the curing agent. In the sample E, the adhesion was lowered due to the reduction of the curing agent. In the sample F, with respect to the transparency, the sample was slightly colored due to the increase of the phosphorescent material powder. Further, the luminance was lowered due to the increase of the phosphorescent material powder. In the sample G, the adhesion was lowered due to the reduction of the curing agent, and, with respect to the transparency, the sample was slightly colored due to the increase of the phosphorescent material powder.

From the above results, it has been found that the metallic product according to the first embodiment of the invention exhibits the most excellent performance when the amount of the phosphorescent material powder in the transparent phosphorescence material is 20%, the amount of the resin is 60%, and the amount of the curing agent is 20%.

Next, with respect to the metallic product according to the second embodiment of the invention, a test was conducted in which the performance was compared between samples in which the formulation for the phosphorescent material powder and resin (acrylic resin) and the thickness of the primer (alkyd resin) were changed. With respect to the samples, using a phosphorescent material powder having a particle diameter of 1 to 10 μm, transparent phosphorescence materials having three different types of formulations were prepared, and films of a primer with three different thicknesses were individually applied to a metal substrate having a surface treated by plating or the like, and the above transparent phosphorescence materials were individually deposited onto the resultant metal substrates to prepare nine different types of metallic products (samples H to P).

With respect to the samples H to P, three types of tests for the adhesion to a metal, transparency, and luminance were conducted. In the test method for the adhesion to a metal, a test was conducted in accordance with JIS K5600-5-6, and the results were shown by predetermined point rating (classification). The larger the point, the more likely the material is peeled off. In the test method for the transparency, 10 persons performed visual observation, and, when 8 or more persons answered that the sample was transparent, the sample was rated ○, and, when 5 to 7 persons answered that the sample was transparent, the sample was rated Δ. In the test method for the luminance, a sample was irradiated using a D65 light source at 200 lx for 20 minutes and then, after 60 minutes lapsed, a luminance was measured. The results are shown in Table 2.

TABLE 2

| Sample name | H | I | J | K | L | M | N | O | P |
|---|---|---|---|---|---|---|---|---|---|
| Particle diameter of phosphorescent material powder μm | 1 to 10 | | | | | | | | |
| Thickness of prime (alkyd resin) μm | 5 | | | 15 | | | 25 | | |
| Phosphorescent material powder % | 5 | 10 | 15 | 5 | 10 | 15 | 5 | 10 | 15 |
| Resin (acrylic resin) % | 95 | 90 | 85 | 95 | 90 | 85 | 95 | 90 | 85 |
| Adhesion to metal (predetermined classification point) | 1 | 1 | 1 | 0 | 0 | 1 | 0 | 0 | 0 |
| Transparency | Δ | ○ | ○ | Δ | ○ | ○ | Δ | Δ | Δ |
| Luminance (uniform light emission) mcd/m$^2$ | 3 | 5 | 5 | 3 | 5 | 5 | 3 | 5 | 5 |

As can be seen from the above, the performance of the sample L was the most excellent. In the sample H, with respect to the transparency, the sample was slightly opaque due to the increase of the resin. Further, the adhesion was slightly lowered due to a lack of the primer. With respect to the luminance, the light emission was uniform but weak due to the reduction of the phosphorescent material powder. In the sample I, the adhesion was slightly lowered due to a lack of the primer. In the sample J, the adhesion was slightly lowered due to a lack of the primer and the reduction of the resin. In the sample K, with respect to the luminance, the light emission was uniform but weak due to the reduction of the phosphorescent material powder. Further, with respect to the transparency, the sample was slightly opaque due to the increase of the resin. In the sample M, the adhesion was slightly weak due to the reduction of the resin. In the sample N, with respect to the luminance, the light emission was uniform but weak due to the reduction of the phosphorescent material powder. Further, with respect to the transparency, the sample was slightly opaque due to the increase of the primer. In the sample O and sample P, with respect to the transparency, the samples were slightly opaque due to the increase of the primer.

From the above results, it has been found that the metallic product according to the second embodiment of the invention exhibits the most excellent performance when the amount of the phosphorescent material powder in the transparent phosphorescence material is 10%, the amount of the resin is 90%, and the thickness of the primer is 15 µm.

REFERENCE SIGNS LIST

10; 16: Metallic product
12; 18: Metal substrate
12a; 18a: Surface
14; 20: Transparent phosphorescence material
16: Metallic product
22: Primer

The invention claimed is:

1. A metallic product comprising:
   (A) a metal substrate, which has a mirror-finished surface;
   (B) a transparent primer applied to the mirror-finished surface of the metal substrate, wherein the transparent primer is a resin having thermosetting properties, and a thickness of the primer applied to the metal substrate is 10 to 20 µm; and
   (C) a transparent phosphorescence material applied to the mirror-finished surface of the metal substrate via the transparent primer, the transparent phosphorescence material comprising:
      (i) a mixture of a phosphorescent material powder obtained by pulverizing a phosphorescent material, and a resin having thermosetting properties, wherein:
         the phosphorescent material powder has an average particle diameter of 1 to 10 µm; and
         a mass ratio of the phosphorescent material powder and the resin is such that, in the mixture, the phosphorescent material powder is 5 to 15 wt % and the resin is 85 to 95 wt %, with respect to a combined weight of the phosphorescent material powder and the resin;
      (ii) a pigment having a color which is a complementary color of a color of the phosphorescent material powder; and
      (iii) a high refractive-index material having a refractive index in a range of 2.0 to 2.7;
   wherein:
      when the transparent phosphorescence material is applied to the surface of the metal substrate via the transparent primer, the surface of the metal substrate is visible through the transparent phosphorescence material and the transparent primer; and
      the transparent phosphorescence material emits light due to phosphorescence in the dark.

2. The metallic product according to claim 1, wherein the phosphorescent material powder is obtained by pulverizing a phosphorescent material formed from a zinc sulfide (ZnS), strontium magnesium silicate ($SrMgSi_2O_7$), or strontium aluminate ($SrAl_2O_4$) inorganic material.

* * * * *